United States Patent [19]
Perkins

[11] Patent Number: 5,275,213
[45] Date of Patent: Jan. 4, 1994

[54] FUEL FILLING AND VENTING DEVICE

[75] Inventor: Frederick M. Perkins, Ft. Lauderdale, Fla.

[73] Assignee: Perko, Inc., Miami, Fla.

[21] Appl. No.: 32,943

[22] Filed: Mar. 17, 1993

Related U.S. Application Data

[63] Continuation-in-part of Ser. No. 8,344, Jan. 22, 1993, abandoned.

[51] Int. Cl.$^5$ .......................................... B65B 31/06
[52] U.S. Cl. ........................................ 141/59; 141/98; 141/286; 220/86.1; 220/88.2; 220/563; 220/DIG. 33
[58] Field of Search .................. 141/59, 447; 137/589; 220/DIG. 33; 220/86.1; 220/86.2; 220/88.1; 220/88.2; 220/562; 220/563; 220/565; 137/587-46; 141/98; 141/285; 141/286; 55/387

[56] References Cited

U.S. PATENT DOCUMENTS

| 0,131,439 | 7/1992 | Bucci | 141/59 |
|---|---|---|---|
| 2,356,327 | 8/1944 | Lubus | 220/88.2 |
| 2,388,395 | 11/1945 | Duggan | 220/88.2 |
| 2,494,679 | 1/1950 | Ward, Jr. | 220/88.2 |
| 3,334,667 | 8/1967 | Hedstrom | 141/46 |
| 3,385,468 | 5/1968 | Fleming et al. | |
| 3,907,153 | 9/1975 | Mutty | |
| 3,981,156 | 9/1976 | Modisette et al. | |
| 4,058,147 | 11/1977 | Stacy et al. | 141/45 |
| 4,113,138 | 9/1978 | Fields et al. | |
| 4,265,752 | 5/1981 | O'Banion | |
| 4,450,880 | 5/1984 | Scheurebrand | 141/288 |
| 4,714,172 | 12/1987 | Morris | 220/DIG. 33 X |
| 4,722,454 | 2/1988 | Fischer | |
| 4,730,652 | 3/1988 | Bartholomew | 141/302 |
| 4,769,050 | 9/1988 | Shaw et al. | |
| 4,809,863 | 3/9189 | Woodcock et al. | |
| 4,816,045 | 3/1989 | Szlaga et al. | 141/286 X |
| 4,854,469 | 8/1989 | Hargest | |
| 4,877,146 | 10/1989 | Harris | 141/44 X |
| 4,932,444 | 6/1990 | Micek | 141/59 |
| 4,963,169 | 10/1990 | Granville | 55/188 |
| 5,022,433 | 6/1991 | Jansky et al. | 137/588 X |
| 5,103,877 | 4/1992 | Sherwood et al. | 141/59 |
| 5,195,566 | 3/1993 | Oh et al. | 141/59 X |

*Primary Examiner*—Ernest G. Cusick
*Attorney, Agent, or Firm*—Laubscher & Laubscher

[57] ABSTRACT

A liquid fuel tank filling and venting device including a hollow body member containing a chamber, an inlet opening for supplying fuel downwardly into the chamber, a fuel outlet opening for supplying fuel from the chamber, and an overflow opening connected with the chamber, each of the fuel outlet and overflow outlets being independently connected with the fuel tank, whereby overflow fuel is returned to the chamber via the overflow outlet. A fuel cap is provided for closing the inlet opening, the fuel cap containing a vent passageway including a removably mounted filter, so that the tank is continuously vented to atmosphere when the fuel cap is in either the open or closed position.

17 Claims, 3 Drawing Sheets

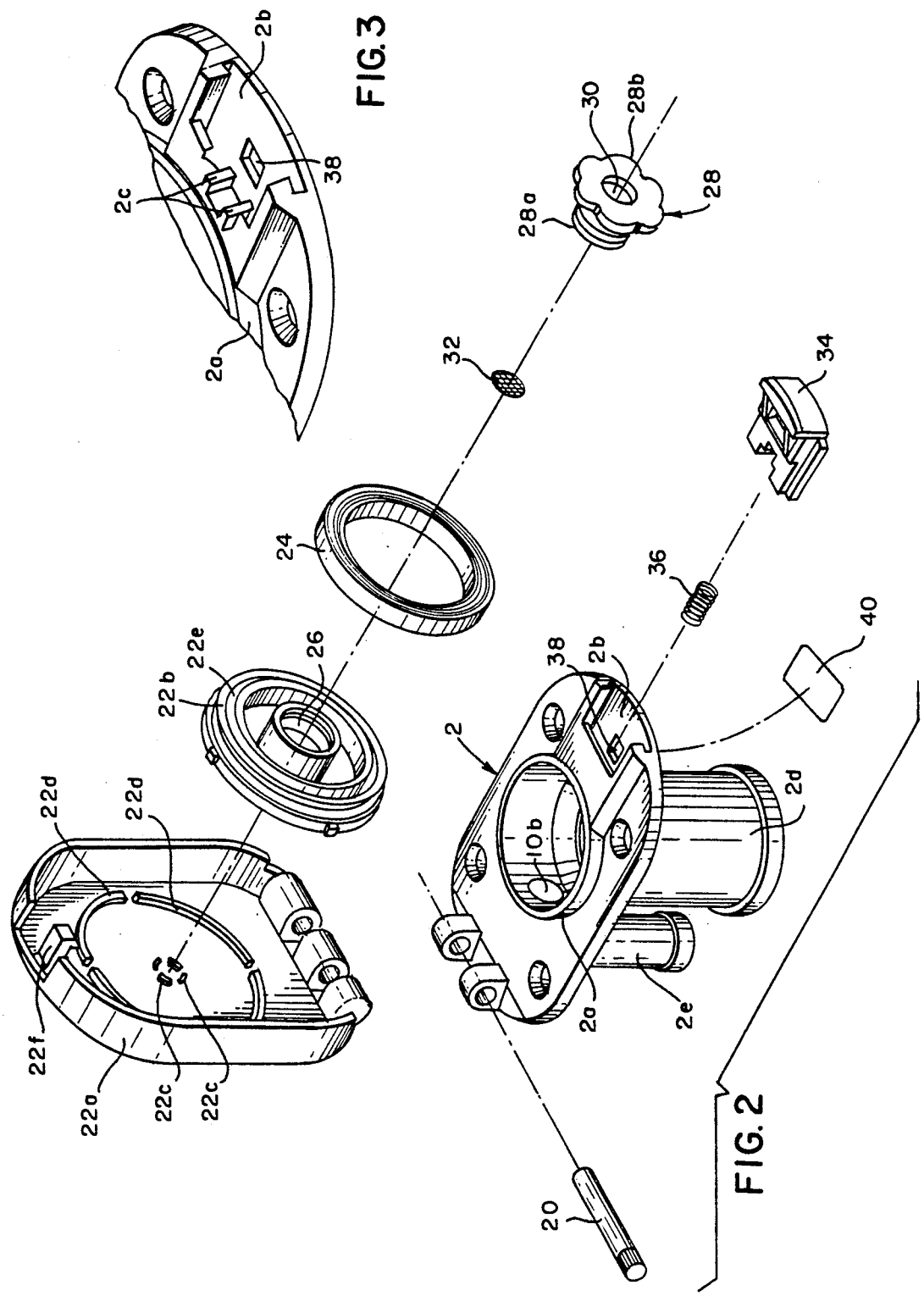

FUEL FILLING AND VENTING DEVICE

REFERENCE TO PRIOR APPLICATION

This is a continuation-in-part application based on the earlier U.S. patent application Ser. No. 08/008,344 filed Jan. 22, 1993, in the name of Frederick M. Perkins entitled "Gas Filling and Venting Device", now abandoned.

BRIEF DESCRIPTION OF THE INVENTION

A liquid fuel tank filling and venting device includes a hollow body member containing a chamber, a fuel inlet opening for supplying fuel to the chamber, a fuel outlet opening for supplying fuel from the chamber to the tank, and an overflow opening connected with the chamber and with the tank and operable during filling of the tank to vent the tank and to return overflow fuel to the chamber. A fuel cap is provided for opening and closing the fuel inlet opening, said cap containing a venting passageway including a filter, whereby the tank is continuously vented to atmosphere via the overflow opening and the chamber when the fuel cap is in either of its open and closed positions.

BRIEF DESCRIPTION OF THE PRIOR ART

Fuel filling devices for marine fuel tanks and the like are well known in the patented prior art, as evidenced by the prior patents to Fields et al U.S. Pat. No. 4,113,138, Scheurenbrand U.S. Pat. No. 4,450,880 and Fisher U.S. Pat. No. 4,722,454, among others. In the case of permanently installed marine fuel tanks, efforts have been made to improve the method of ventilating (i.e., releasing the air pressure of) the tanks during the filling thereof with liquid fuels such as gasoline or diesel oil. It has been common in the past to provide two separate components for the tank filling and venting functions, such as a gas tank venting device, and a gas or diesel deck plate.

The present invention was developed to provide a combined one-piece filling and venting device that reduces labor and material manufacturing costs, which affords continuous venting of the fuel tank to atmosphere when the fuel cap is in either of its open or closed positions, and which allows overflow fuel from the vent line to return to the fuel tank via the fuel supply passage formed in the hollow body member, thereby to avoid inadvertent fuel spills caused by overflow during refueling.

SUMMARY OF THE INVENTION

Accordingly, a primary object of the present invention is to provide a fuel device having a hollow body member containing a chamber, and including an upper fuel inlet opening for supplying fuel to the chamber, a lower fuel outlet opening for supplying fuel from the chamber to the tank, and an overflow opening for returning overflow fuel from the tank to the chamber during the tank filling operation, together with a fuel cap operable between closed and open positions relative to the inlet opening, said fuel cap containing a vent passageway for venting the fuel tank to atmosphere when the fuel cap is in the closed position.

According to a more specific object of the invention, a back flame arrester or filter is removably mounted in the vent passageway so as to provide unrestricted venting and to reduce the possibility of fuel blow-back. Since the filter or arrester is removably mounted on the fuel cap, it is conveniently located for removal and cleaning, and since it is functional only when the fuel cap is in the closed position, the filter or arrester is subjected only to relatively low fuel vapor flow rates, whereby clogging of the filter is reduced.

BRIEF DESCRIPTION OF THE DRAWINGS

Other objects and advantages of the invention will become apparent from a study of the following specification, when viewed in the light of the accompanying drawings, in which:

FIG. 2 is an exploded perspective view of the apparatus of FIG. 1 with the fuel cap in the open position;

FIG. 3 is a detailed perspective view of the latching portion of the filling and venting body member of FIG. 2;

DETAILED DESCRIPTION

Figure 1:
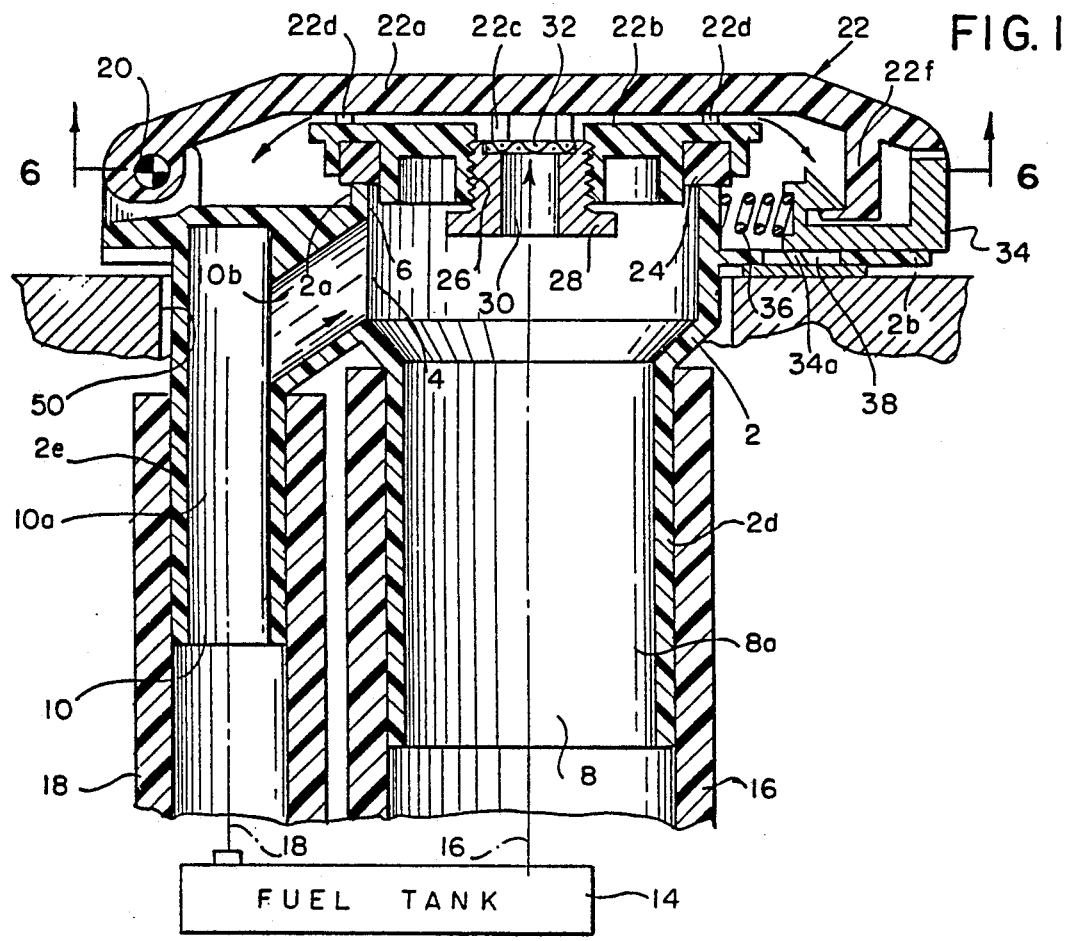
FIG. 1 is a sectional view of the fuel filling and venting device with the fuel cap member in the closed position.
Figure 4:
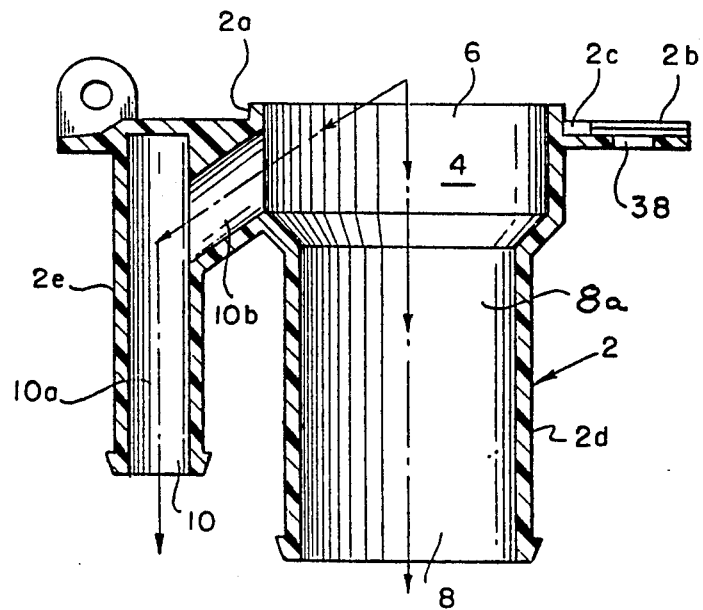
FIG. 4 is a sectional view of the body member of FIGS. 1-3.
Figure 7:
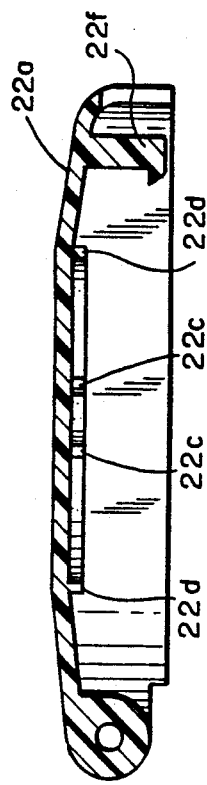
FIGS. 7 and 8 are sectional views of the cover and seal retainer sections, respectively, of the fuel cap member of FIGS. 5 and 6.
Figure 8:
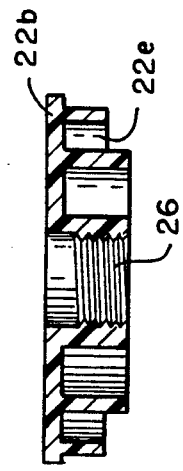
Figure 9:
FIGS. 9-11 are sectional views of the annular seal, the filter screen and the vent bolt, respectively, of FIGS. 1 and 2.
Figure 10:
Figure 11:
Figure 5:
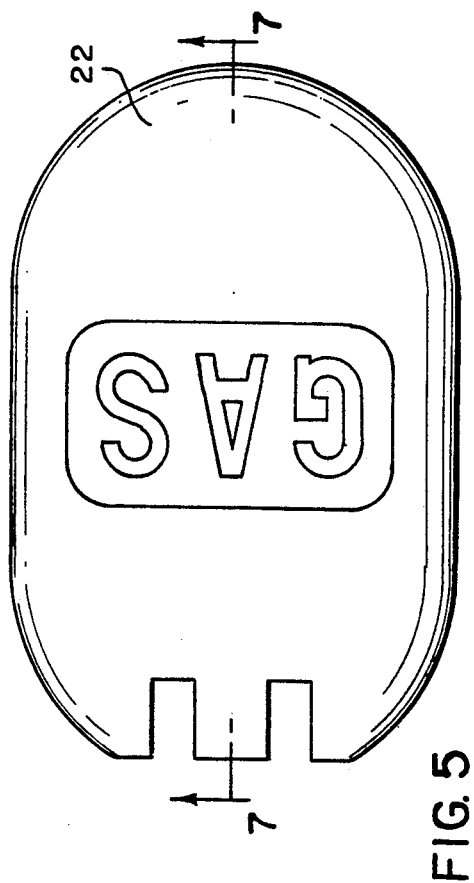
FIG. 5 is a top view of the fuel cap member of FIG. 1.
Figure 6:
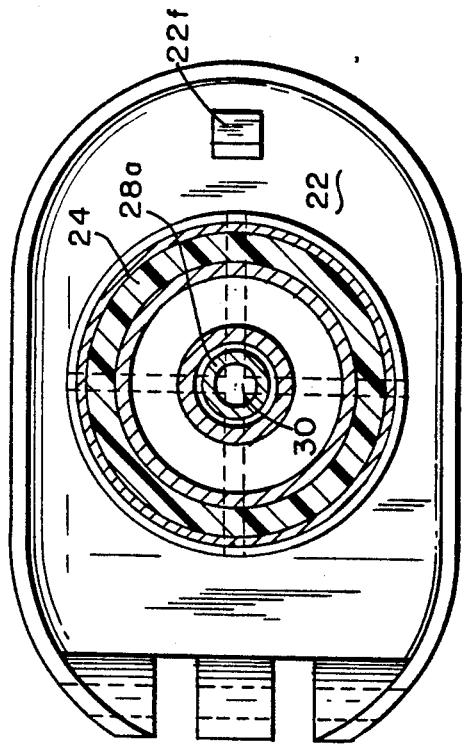
FIG. 6 is a sectional view taken along line 6—6 of FIG. 1.

Referring first more particularly to FIGS. 1 and 2, the fuel filling and venting device includes a hollow body member 2 containing a chamber 4 and provided with a fuel inlet opening 6, a fuel outlet opening 8, and an overflow opening 10. The body member includes an annular neck portion 2a arranged concentrically about the fuel inlet opening 6. The outlet and overflow openings 8 and 10 are connected with the fuel tank 14 via conduits 16 and 18, respectively.

Hingedly connected with the upper portion of the body member 2 by means of pivot shaft 20 is a fuel cap closure member 22 that includes a cover section 22a, and an annular inner section 22b. As best shown in FIG. 2, the lower surface of the cover section 22a includes a plurality of integral circularly-arranged circumferentially-spaced first rib portions 22c, and a plurality of integral circularly-arranged circumferentially-spaced second rib portions 23d that are arranged in concentrically spaced relation about said first rib portions 22c. Referring to FIG. 1, the seal retainer section 22b has a flat upper surface that is permanently secured to the adjacent free extremities of the second cover rib portions 22d. Thus, when the cover and seal retainer sections are formed of a suitable synthetic plastic material (such as acetal resins and nylon resins, both in fiber and non-fiber filled variations, for example), the two sections may be secured together by high-frequency bonding techniques, by an adhesive, or other suitable securing means. In the case of sections formed from a metal or a metal alloy, the sections may be welded or otherwise bonded together. The lower end of the seal retainer section 22b contains an annular groove 22e for receiving a resilient annular seal member 24 which is arranged for seating engagement with the upper end extremity of the annular body member neck portion 2a when the fuel cap member is in the closed position illustrated in FIG. 1. The central bore 26 contained within the fuel retainer section 22b is threaded for screw-thread connection with the threaded portion 28a of a venting bolt 28 having an enlarged head portion 28b, which bolt contains a through bore defining a venting passage 30. Mounted in a counterbore defined within the threaded end 28a of the venting bolt 28 is a meshed screen or fibrous back flame arresting filter element 32 formed of a suitable synthetic plastic or metal filtering material. The venting bolt 28 is normally threaded within the bore 26 to a position at which the filter element 32 is in seated engagement with the adjacent extremities of the integral first ribs 22c carried by the lower surface of the fuel cap cover section 22a.

In accordance with the present invention, latch means are provided for releasably locking the fuel cap member in its closed position shown in FIG. 1. To this end, the outer cover section 22a is provided on its inner surface with an integral downwardly depending keeper portion 22f, and the body member is provided with a latch button 34 that is slidably mounted in corresponding guide slot means 2b (as shown in FIGS. 2 and 3). A compression spring 36 is captured at one end between shoulder portions 2c on the body member 2, and at its other end in a corresponding recess contained in the adjacent end of the release button 34, said spring being operable to bias the release button to the right toward its locking position relative to keeper portion 22f, as shown in FIG. 1. The bottom wall of the guide groove means 2b contains a through opening 38 into which is snapped a resilient locking projection 34a integral with the release button 34, thereby to retain the release button 34 in the guide slot means 2b against the biasing force of spring 36. A label layer 40 is mounted (for example, by pressure sensitive adhesive means) on the lower surface of the guide slot means 2b, thereby to prevent caulking material from entering the opening 38 and adversely affecting the operation of the release button 34.

In the embodiment illustrated in FIGS. 1 and 2, the lower portion of the body member is bifurcated to define a pair of downwardly extending leg portions 2d and 2e the lower extremities of which contain the fuel outlet and overflow openings 8 and 10, respectively. The fuel outlet opening 8 is arranged directly below the fuel inlet opening 6 and is connected with chamber 4 via a generally linear fuel outlet passage 8a. The overflow opening 10 is connected with chamber 4 via a first passage portion 10a that is generally parallel with passage 8a, and an angularly inwardly directed second portion 10b. The diameter of the bypass opening and the associated passage portions is less than that of the fuel outlet opening 8.

In operation, the body member 2 of the fuel filling and venting device is mounted within an opening 50 contained in the boat structure adjacent the fuel tank 14. Flexible conduits 16 and 18 connect the fuel supply outlet 8 and the overflow opening 10, respectively, with the fuel tank 14.

In order to supply fuel to the fuel tank 14, release button 34 is inserted against the biasing force of spring 36, thereby to unlatch the button 34 from the keeper portion 22f, whereby fuel cap 22 including the annular retainer section 2b, the back flame arresting filter 32, the vent plug 28, and the annular seal 24 are pivoted upwardly as a unit to expose the fuel supply opening 2. Liquid fuel, such as gasoline or diesel oil, is pumped into the chamber 4 via inlet 6 and flows downwardly through passage 8a to outlet 8, whereupon the fuel is guided by conduit 16 into the fuel tank 14. During the filling operation, air is displaced upwardly through conduit 18 into chamber 4 via vent passage portions 10a and 10b. In the event that there were to be any fuel overflow during the filling operation, it is returned to the fuel tank via vent passages 10a and 10b, chamber 4, the downwardly extending fuel supply passage 8a, and conduit 16.

When the filling of the tank has been completed, the cover member 22 is pivoted to its closed position shown in FIG. 1, whereupon the keeper member 22f snaps into locking engagement with the spring-biased release button 34. The fuel tank continues to be vented to atmosphere via conduit 18, overflow opening 10, overflow passage portions 10a and 10b, chamber 4, bore 30, back flame arresting filter 32, and the radial spaces defined between the first and second integral ribs 22c and 22d.

While the body member 2 and the cover member 22 have been illustrated as being formed of synthetic plastic material, it is apparent that these components could be formed of metal, if desired.

As indicated above, when the fuel cap member is in the closed position indicated in FIG. 1, vapor flow rate is low, and clogging of the back flame arrester or screen 32 is reduced to a minimum. Conversely, in the fixed vent systems of the prior art, progressive clogging first effects the system through fuel backflow, thereby producing overboard discharge of fuel contrary to current environmental regulations.

While the preferred forms and embodiments of the invention have been illustrated and described, it will be apparent that other changes may be made without deviating from the inventive concepts set forth above.

What is claimed is:

1. Liquid fuel tank filling and venting apparatus, comprising:
   (a) a body member containing:
      (1) a chamber;
      (2) fuel inlet and fuel outlet openings in communication with, and arranged above and below, said chamber, respectively; and
      (3) a fuel tank overflow opening in communication with said fuel chamber, each of said fuel outlet and fuel overflow openings being adapted for separate connection with the fuel tank;
      (4) said fuel outlet and fuel overflow openings being so arranged relative to said fuel inlet opening that during the filling of the tank, the tank is vented by, and excess fuel is returned to, said chamber via said fuel overflow opening;
   (b) closure means operable between closed and open positions relative to said body member for closing and opening said fuel inlet opening, respectively, said closure means containing means defining a vent passageway for continuously affording communication between said chamber and atmosphere when said closure means is in the closed position; and
   (c) back flame arresting filter means mounted in said vent passageway for filtering the fluid that flows therethrough when said cap is in the closed position.

2. Apparatus as defined in claim 1, wherein said closure means comprises a fuel cap member.

3. Apparatus as defined in claim 2, wherein said fuel cap member includes an annular seal arranged for seated engagement with said body member concentrically about said fuel inlet opening when said fuel cap is in said closed position.

4. Apparatus as defined in claim 3, wherein said body member includes an integral annular neck portion extending upwardly from, and extending concentrically about, said fuel inlet opening, said seal being arranged for seated engagement with the upper end extremity of said body member neck portion.

5. Apparatus as defined in claim 3, wherein said vent passageway includes a first portion that extends coaxially of, and is in communication at one end with, said fuel inlet opening when said cap member is in the closed position, and a second portion that extends radially outwardly from the other end of said passageway first portion, said second portion at its outer end being in communication with atmosphere.

6. Apparatus as defined in claim 5, wherein said back flame arresting filter means comprises a circular disk formed of filtering material, and means for removably mounting said filter disk transversely across said vent passageway first portion.

7. Apparatus as defined in claim 6, wherein said vent passageway first portion is threaded; wherein said fuel cap includes a plurality of integral spaced circularly arranged first ribs opposite said fuel inlet opening when said fuel cap is in the closed position; and further wherein said filter mounting means includes a nut member threadably mounted in said vent passageway first portion for maintaining said filter member in engagement with said first ribs, said nut member containing a longitudinal through bore.

8. Apparatus as defined in claim 7, wherein said cap member is sectional and includes an outer cover section having outer and inner surfaces, said first ribs being integral with the inner surface of said outer cover section, said cover section including on said inner surface a plurality of integral circularly-arranged circumferentially-spaced second ribs arranged concentrically about said first ribs, said cap member including also an annular seal retainer section arranged generally coaxially relative to said second ribs, said seal retainer section having at one end a generally flat surface bonded to the extremities of said second ribs, the other end of said seal retainer section containing an annular groove in which said annular seal is mounted, the central portion of said seal retainer section within said annular groove containing said venting bore, whereby the spaces between said first ribs and between said second ribs define radially extending venting passageways.

9. Apparatus as defined in claim 6, wherein said circular disk comprises a metal screen.

10. Apparatus as defined in claim 2, and further including means connecting said fuel cap with said body member for pivotal movement between said closed and open positions relative to said fuel inlet opening.

11. Apparatus as defined in claim 10, and further including releasable latch means for maintaining said fuel cap in the closed position.

12. Apparatus as defined in claim 11, wherein said latch means includes a stationary latch keeper on one of said body and cap members, a latch button mounted for sliding movement on the other of said body and cop members between locked and unlocked positions relative to said latch keeper, and spring means biasing said latch button toward said locked position.

13. Apparatus as defined in claim 1, wherein said fuel outlet is generally opposite said fuel inlet openings, and further wherein said overflow opening is laterally spaced from, and has a smaller diameter than, said fuel outlet opening.

14. Apparatus as defined in claim 13, wherein the lower portion of said body member is bifurcated to define a pair of downwardly extending leg portions, said fuel outlet and said overflow openings being contained in the lowermost extremities of said body member leg portions, respectively.

15. Apparatus as defined in claim 14, wherein said body member contains fuel outlet and overflow passages connecting said fuel outlet and said overflow openings with said chamber, respectively, said overflow passage including a first portion connected at one end with said overflow opening and extending therefrom in a direction generally parallel with said fuel outlet passage.

16. Apparatus as defined in claim 1, wherein said back flame arresting means comprises a screen.

17. Apparatus as defined in claim 16, wherein said screen is formed of metal.

* * * * *